(12) United States Patent
Asakawa et al.

(10) Patent No.: US 12,222,558 B2
(45) Date of Patent: *Feb. 11, 2025

(54) OPTICAL CONNECTOR CLEANING TOOL

(71) Applicant: NTT ADVANCED TECHNOLOGY CORPORATION, Kanagawa (JP)

(72) Inventors: Shuichiro Asakawa, Kanagawa (JP); Kenta Arai, Kanagawa (JP); Etsu Hashimoto, Kanagawa (JP)

(73) Assignee: NTT ADVANCED TECHNOLOGY CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,389

(22) Filed: Nov. 29, 2023

(65) Prior Publication Data

US 2024/0094474 A1 Mar. 21, 2024

Related U.S. Application Data

(63) Continuation of application No. 17/421,268, filed as application No. PCT/JP2019/045543 on Nov. 21, 2019, now Pat. No. 11,880,073.

(30) Foreign Application Priority Data

Jan. 18, 2019 (JP) ................. 2019-006688

(51) Int. Cl.
*G02B 6/38* (2006.01)
*B05B 17/06* (2006.01)
(Continued)

(52) U.S. Cl.
CPC ........ *G02B 6/3866* (2013.01); *B05B 17/0615* (2013.01); *B05B 7/0012* (2013.01); *B05B 17/0646* (2013.01)

(58) Field of Classification Search
CPC ............ B05B 17/0615; B05B 17/0646; B05B 7/0012; G02B 6/3866
See application file for complete search history.

(56) References Cited

U.S. PATENT DOCUMENTS 3,816,868 A 6/1974 Dotsko
5,735,013 A 4/1998 Yaguchi et al.
(Continued)

FOREIGN PATENT DOCUMENTS

CN 1604824 A 4/2005
CN 1798993 A 7/2006
(Continued)

OTHER PUBLICATIONS

International Preliminary Report on Patentability received for PCT Patent Application No. PCT/JP2019/045543, mailed on Jul. 29, 2021, 13 pages (8 pages of English Translation and 5 pages of Original Document).
(Continued)

*Primary Examiner* — Benjamin L Osterhout
(74) *Attorney, Agent, or Firm* — WOMBLE BOND DICKINSON (US) LLP

(57) ABSTRACT

An optical connector cleaning tool includes a cleaning portion pressed against a coupling end face of an optical connector, a container storing a cleaning liquid, and an atomizer spraying the cleaning liquid to the cleaning portion.

4 Claims, 4 Drawing Sheets

(51) Int. Cl.
*B05B 7/00* (2006.01)
*B05B 17/00* (2006.01)

(56) References Cited

U.S. PATENT DOCUMENTS

| | | | |
|---|---|---|---|
| 6,863,080 | B2 | 3/2005 | Clatanoff et al. |
| 7,089,624 | B2 | 8/2006 | Malevants et al. |
| 7,215,864 | B1 | 5/2007 | Qian et al. |
| 11,880,073 | B2 * | 1/2024 | Asakawa ............ B05B 17/0615 |
| 2002/0162582 | A1 | 11/2002 | Chu et al. |
| 2003/0111094 | A1 | 6/2003 | Clatanoff et al. |
| 2003/0169991 | A1 | 9/2003 | Malevanets et al. |
| 2003/0169992 | A1 | 9/2003 | Fujiwara et al. |
| 2003/0221706 | A1 | 12/2003 | Kiani et al. |
| 2004/0005134 | A1 | 1/2004 | Sun et al. |
| 2008/0000037 | A1 | 1/2008 | Christopher et al. |
| 2008/0028567 | A1 | 2/2008 | Hackert |
| 2013/0185883 | A1 | 7/2013 | Murakami et al. |
| 2016/0170153 | A1 | 6/2016 | Forrest, Jr. |
| 2017/0351039 | A1 | 12/2017 | Nakane et al. |
| 2020/0070211 | A1 | 3/2020 | Brown et al. |

FOREIGN PATENT DOCUMENTS

| | | | |
|---|---|---|---|
| EP | 1453619 | A1 | 9/2004 |
| EP | 1483611 | B1 | 2/2007 |
| GB | 0803917 | A | 11/1958 |
| GB | 2458107 | A | 9/2009 |
| JP | 2005-511302 | A | 4/2005 |
| JP | 2006-208481 | A | 8/2006 |
| JP | 2007-035662 | A | 2/2007 |
| JP | 2008-008992 | A | 1/2008 |
| JP | 2011-156481 | A | 8/2011 |
| JP | 4759760 | B2 | 8/2011 |
| JP | 2013-167875 | A | 8/2013 |
| JP | 5279740 | B2 | 9/2013 |
| JP | 2017-217602 | A | 12/2017 |
| KR | 10-2004-0064304 | A | 7/2004 |
| KR | 10-2004-0101290 | A | 12/2004 |
| WO | 2003/051543 | A1 | 6/2003 |
| WO | 2004/093130 | A2 | 10/2004 |
| WO | 2018/009802 | A1 | 1/2018 |
| WO | 2020/005640 | A1 | 1/2020 |

OTHER PUBLICATIONS

International Search Report and Written Opinion received for PCT Patent Application No. PCT/JP2019/045543, mailed on Jan. 7, 2020, 15 pages (8 pages of English Translation and 7 pages of Original Document).

Office Action received for Chinese Patent Application No. 201980089227.9, mailed on Mar. 31, 2022, 13 pages (5 pages of English Translation and 8 pages of Office Action).

PZT Electronic Ceramic Co. Ltd., "Product", Homepage, Available Online at <http://ja.piezodisc.com/mistgeneration/piezo-microporous-atomizer/piezo-ultrasonic-humidifier-disc-with-mesh.html>, searched on Nov. 19, 2019, 9 pages (5 pages of English Translation and 4 pages of Office Action).

Supplementary European Search Report and Search Opinion received for EP Patent Application No. 19909810.4, mailed on Aug. 4, 2022, 9 pages.

* cited by examiner

OPTICAL CONNECTOR CLEANING TOOL

TECHNICAL FIELD

The present invention relates to an optical connector cleaning tool configured to clean a coupling end face of an optical connector.

BACKGROUND ART

Along with the recent remarkable development of optical communication or optical transmission techniques, the speed and capacity are increasing. In these techniques, degradation of transmission quality caused by dirt on an optical coupling portion poses a problem. For example, in an optical connector configured to easily and precisely couple optical fibers, optical coupling is implemented for a fiber core whose diameter is as small as 10 μm in a state in which the coupling end faces of ferules that fix optical fibers are made to face each other. Hence, if dirt such as oil or dust adheres to the coupling end face of the optical connector, an increase in the insertion loss of the optical connector or a decrease in the return loss occurs, and an optical signal cannot normally be transmitted. Hence, it is important to clean the coupling end face of the optical connector and remove dirt or adhered substances.

To execute such cleaning, there exists a cleaning tool in which a cleaning cloth bag made of ultra-super fine fibers is put on the distal end of a thin rod (see patent literature 1). There also exists a rod-shaped cleaning tool including, at the distal end of a rod, a cleaning portion made of foamed urethane of a continuous porous body.

As the above-described cleaning tool used to clean the coupling end face of the optical connector, there is also proposed a cleaning tool that supplies a cleaning cloth from a reel on which the cleaning cloth is wound (see patent literature 2).

RELATED ART LITERATURE

Patent Literature

Patent Literature 1: Japanese Patent Laid-Open No. 2006-208481
Patent Literature 2: Japanese Patent Laid-Open No. 2013-167875
Patent Literature 3: Japanese Patent Laid-Open No. 2017-217602

Non-Patent Literature

Non-Patent Literature 1: PZT Electronic Ceramic Co., Ltd, homepage "Product", [searched for Nov. 19, 2019] (http://ja.piezodisc.com/mist-generation/piezo-microporous-atomizer/piezo-ultrasonic-humidifier-disc-with-mesh.html).

DISCLOSURE OF INVENTION

Problem to be Solved by the Invention

However, the above-described cleaning tools are of so-called dry type, and the cleaning power to dirt adhered to the coupling end face of an optical connector is insufficient. To clean adhered dirt of this type, a wet-type cleaning tool using a cleaning liquid is demanded. In wet cleaning of this type, for example, a cleaning liquid transported by pressing a piston pump is injected from an injection nozzle and supplied to a cleaning portion such as a cleaning cloth. Alternatively, a cleaning liquid transported by pressing a piston pump is dropped from a drop device, thereby supplying the cleaning liquid to a cleaning portion. There is also proposed a cleaning tool that supplies a cleaning liquid to a band-shaped cleaning body using a tube and wets the cleaning body with the cleaning liquid (see patent literature 3).

However, in the cleaning liquid supply as described above, it is not easy to control the amount of the cleaning liquid to be supplied, and the cleaning liquid more than a necessary amount is supplied to the cleaning portion. If cleaning is executed in this state by bringing the cleaning portion into contact with an end face of an optical connector, for example, the cleaning liquid that wets the cleaning portion remains on the end face of the optical connector and makes the end face of the optical connector dirty.

The present invention has been made to solve the above-described problem, and has as its object to provide an optical connector cleaning tool capable of supplying an appropriate amount of cleaning liquid to a cleaning portion.

Means of Solution to the Problem

According to the present invention, there is provided an optical connector cleaning tool comprising a cleaning portion capable of absorbing a cleaning liquid, a container including a liquid supply port and configured to store the cleaning liquid, an atomizer configured to atomize the cleaning liquid stored in the container by ultrasonic atomization, a supply portion configured to supply mist of the cleaning liquid atomized by the atomizer to the cleaning portion, and a control circuit configured to control an operation time of the atomizer.

Effect of the Invention

As described above, according to the present invention, since the mist of the cleaning liquid atomized by the atomizer by ultrasonic atomization is supplied to the cleaning portion, an appropriate amount of cleaning liquid can be supplied to the cleaning portion.

BEST MODE FOR CARRYING OUT THE INVENTION

Figure 1:
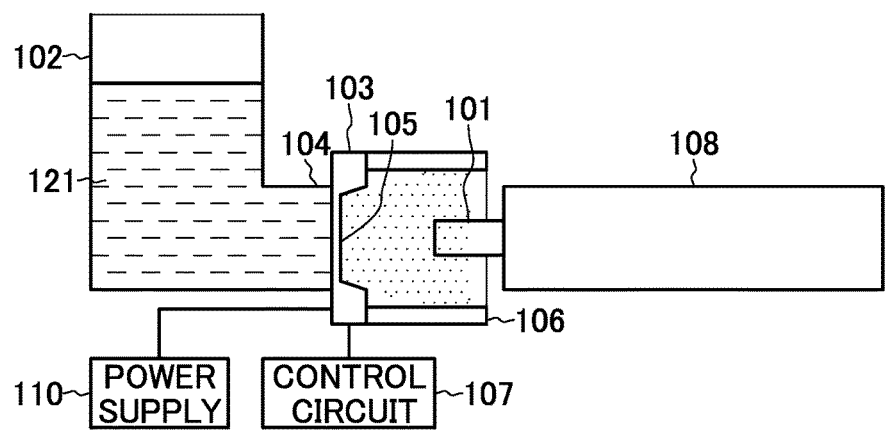
FIG. 1 is a view showing the arrangement of an optical connector cleaning tool according to the embodiment of the present invention.

An optical connector cleaning tool according to the embodiment of the present invention will now be described with reference to FIG. 1. The optical connector cleaning tool includes a cleaning portion 101 capable of absorbing (or adsorbing) a cleaning liquid 121, a container 102 that stores the cleaning liquid 121, and an atomizer 103 that atomizes the cleaning liquid 121 stored in the container 102 by ultrasonic atomization. The container 102 includes a liquid supply port 104. The atomizer 103 is provided on the liquid supply port 104 of the container 102. In addition, the optical connector cleaning tool includes a supply portion 106 that supplies (sprays) mist of the cleaning liquid 121 atomized by the atomizer 103 to the cleaning portion 101.

The cleaning portion 101 is formed by, for example, a cleaning cloth bag made of ultra-super fine fibers (see patent literature 1). The cleaning portion 101 can also be formed by a brush made of a fiber bundle of a plurality of synthetic fiber filament yarns. The cleaning portion 101 may be made of foamed urethane. The cleaning portion 101 is attached to the distal end of a grip portion 108. Alternatively, the cleaning portion 101 can be formed by a band-shaped cloth (see patent literatures 2 and 3).

The atomizer 103 includes an atomizing separation portion 105 that covers the liquid supply port 104 and passes not a liquid but mist. The atomizer 103 can be made of, for example, a piezoelectric ceramic made of a polycrystalline ceramic manufactured by sintering powder of titanium oxide or barium oxide. A part of the atomizer 103 made of the polycrystalline ceramic is made thinner, thereby forming the atomizing separation portion 105. As the atomizer 103, an atomizing unit "NBC103SL" available from Cado can be used. Alternatively, as the atomizer 103, for example, an ultrasonic humidifier disc with mesh holes available from PZT can be used (see non-patent literature 1).

In addition, the optical connector cleaning tool includes a control circuit 107 that controls the operation time of the atomizer 103. The control circuit 107 controls the operation time of the atomizer 103 by a set time. The control circuit 107 can be formed by, for example, a microcomputer, an ASIC (Application Specific Integrated Circuit), or a programmable logic device such as an FPGA (Field-Programmable Gate Array).

When an AC voltage with a frequency of 20 kHz or more is applied from a power supply 110 to an electrode (not shown) provided in the atomizer 103 that is a piezoelectric ceramic, the atomizer 103 (atomizing separation portion 105) oscillates to generate an ultrasonic wave. When the ultrasonic wave is irradiated from the atomizing separation portion 105 in this way, fine droplets (mist) of several μm are generated by ultrasonic atomizing separation from the cleaning liquid 121 that is in contact with the atomizing separation portion 105 on the side of the liquid supply port 104, as is well known. This mist passes through the atomizing separation portion 105 and is radiated to the side of the supply portion 106.

The amount of mist generated by the above-described method can be controlled by the time during which the atomizer 103 is generating the ultrasonic wave (the time during which the atomizer 103 is operating). In the embodiment, the control circuit 107 controls the operation time of the atomizer 103 by a set time, thereby controlling the amount of mist of the cleaning liquid supplied from the atomizing separation portion 105 to the supply portion 106. For example, when a switch (not shown) is turned on, the control circuit 107 operates, and the AC voltage is applied from the power supply 110 to the electrode provided in the atomizer 103 during the set time. While the AC voltage is applied from the power supply 110 to the electrode provided in the atomizer 103, the mist of the cleaning liquid atomized by the atomizer 103 is supplied to the cleaning portion 101.

For example, a plurality of different times are set in the control circuit 107, and the mist of the cleaning liquid is generated. A plurality of test bodies in which the cleaning portion 101 is wet with the cleaning liquid under the respective conditions are produced. For each of the plurality of produced test bodies, test cleaning of an end face of an optical connector is executed. The cleaning state of the end face of the optical connector by the test cleaning is observed, thereby obtaining the time in which an appropriate amount of cleaning liquid is supplied to the cleaning portion 101. The thus obtained time is set in the control circuit 107.

According to the above-described embodiment, an appropriate amount of cleaning liquid can be supplied to the cleaning portion 101.

A more detailed optical connector cleaning tool will be described next with reference to FIG. 2A. In the optical connector cleaning tool, the supply portion 106 includes a tube 113 with an opening at one end 111, in which the cleaning portion 101 is inserted. The atomizer 103 is provided at other end 112 of the tube 113. In addition, the cleaning portion 101 is inserted from the one end 111 of the tube 113. The cleaning portion 101 is connected to the grip portion 108 via a connecting portion 114. The container 102, the control circuit 107, and the power supply 110 are stored on the side of the other end 112 of the tube 113. The container 102 includes a liquid introduction port 109, and includes a lid 115 that can be inserted/removed into/from the liquid introduction port 109. Mist atomized by the atomizer 103 is supplied to the cleaning portion 101 inserted into the tube 113.

At this time, even if an airflow (a wind generated by cooling various kinds of devices, a natural wind outdoors, a wind caused by room temperature adjustment, or the like) exists outside the optical connector cleaning tool, the airflow is blocked by the tube 113 of the supply portion 106, and the mist can stably be supplied to the cleaning portion 101. If a fiber body (not shown) is provided in the container 102 so as to be in contact with the atomizer 103, the mist can be jetted from the atomizer 103 even if the supply portion 106 of the optical connector cleaning tool is directed in an arbitrary direction such as a horizontal or vertical direction because the fiber body absorbs the cleaning liquid.

To clean the coupling end face (not shown) of an optical connector inserted into the adapter of the optical connector, the cleaning portion 101 that has absorbed the cleaning liquid is made to abut against the coupling end face and rotated. As a means for rotating the cleaning portion 101, an operator holds the grip portion 108 and manually rotates the grip portion together with the cleaning portion 101. Alternatively, a mechanism configured to mechanically rotate by a spring or the like is provided in the grip portion 108, and the operator holds the grip portion 108 and rotates the cleaning portion 101. Otherwise, a mechanism configured to rotate by an electric motor, a battery, or the like is provided in the grip portion 108, and the operator holds the grip portion 108 and rotates the cleaning portion 101.

When the grip portion 108 is connected to the tube 113, the cleaning portion 101 is arranged at a predetermined position with respect to the atomizer 103. After a cleaning operation, when wetting another cleaning portion 101 that has been exchanged, the cleaning portion 101 is arranged at the same position with respect to the atomizer 103. This contributes to making the degree of wetting of the cleaning portion 101 constant or adjusting the degree of wetting. The degree of wetting of the cleaning portion 101 can be controlled by the time in which the atomizer 103 is operated. The adjustment can also be done by changing the position of the cleaning portion 101 with respect to the atomizer 103. The adjustment can also be done by the power supplied to the atomizer 103, as a matter of course.

An optical connector cleaning tool including a mechanism configured to notify a humidified state suitable for cleaning during a time until the cleaning portion 101 wetted with the cleaning liquid immediately after mist supply dries will be described next with reference to FIG. 2B. The optical connector cleaning tool includes a timer (not shown) incorporated in a control circuit 107a and configured to measure the time from completion of mist supply, and an indicator 116 formed by an LED or the like and configured to notify the completion of mist supply by lighting immediately after the completion of mist supply, in addition to the optical connector cleaning tool shown in FIG. 2A. The timer can also be provided alone separately from the control circuit.

The indicator 116 lights from a point of time when the operation time controlled by the control circuit 107a has elapsed. In addition, the indicator 116 turns off if the timer measures a time (predetermined time) set from the point of time (immediately after the completion of mist supply) when the operation time controlled by the control circuit 107a has elapsed. For example, the indicator 116 turns off under the control of the control circuit 107a. As the predetermined time, an appropriate value can be set in advance based on the relationship between the time from the completion of mist supply and the observation result of the cleaning state of the end face by a plurality of tests. As a result, a state suitable for cleaning is obtained while the indicator 116 lights.

Another more detailed optical connector cleaning tool will be described with reference to FIG. 3A. The optical connector cleaning tool includes a band-shaped cleaning cloth (cleaning portion) 101a, a supply reel 131 on which the cleaning cloth 101a is wound, and a winding reel 132 that winds the cleaning cloth 101a. The optical connector cleaning tool also includes a guide plate 133 configured to press the cleaning cloth 101a extending from the supply reel 131 to the winding reel 132 against an end face of an optical connector (not shown). The supply reel 131, the winding reel 132, and the guide plate 133 are stored in a housing 134 (see patent literature 2).

The optical connector cleaning tool can also include a conduit 106a serving as a supply portion. By the conduit 106a, the mist of the cleaning liquid atomized by the atomizer 103 is transported to the cleaning cloth 101a. The dispensing hole of the conduit 106a is arranged near the cleaning cloth 101a extending from the supply reel 131 to the winding reel 132. The mist atomized by the atomizer 103 and transported by the conduit 106a is discharged from the dispensing hole and sprayed (supplied) to the cleaning cloth 101a. If the atomizer 103 can be provided near the guide plate 133, the cleaning liquid can also directly be sprayed to the cleaning cloth without using the conduit 106a, as a matter of course.

Figure 4A:
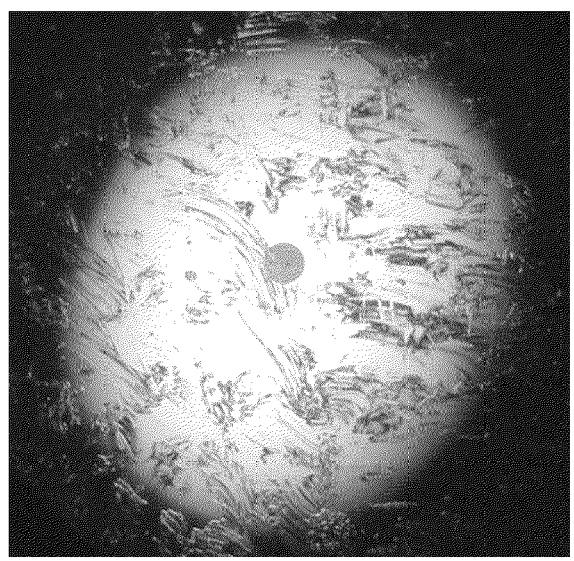
FIG. 4A is a photograph showing a result of observing a dirty end face of an optical connector.
Figure 4B:
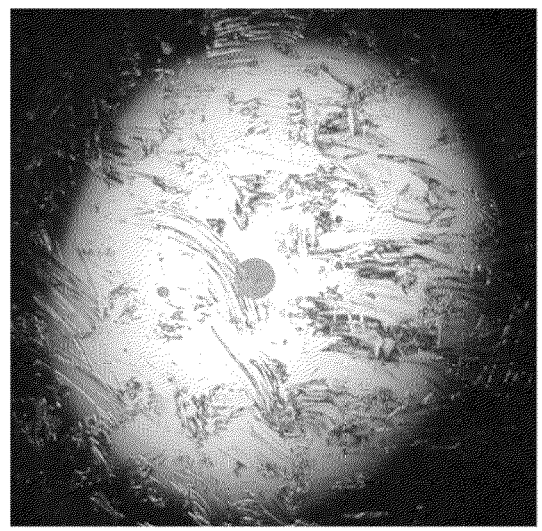
FIG. 4B is a photograph showing a result of observing an end face of an optical connector as a result of cleaning the dirty end face of the optical connector using a conventional dry-type optical connector cleaning tool.
Figure 4C:
FIG. 4C is a photograph showing a result of observing an end face of an optical connector as a result of cleaning the dirty end face of the optical connector using an optical connector cleaning tool according to the embodiment.

The difference in an end face of an optical connector after cleaning between the optical connector cleaning tool according to the embodiment and a conventional dry-type optical connector cleaning tool will be described next with reference to FIGS. 4A, 4B, and 4C. When an end face of an optical connector, which is dirty, as shown in FIG. 4A, is cleaned by the conventional dry-type optical connector cleaning tool, the dirt can hardly be removed, as shown in FIG. 4B. On the other hand, when an end face of an optical connector, which is dirty, as shown in FIG. 4A, is cleaned by the optical connector cleaning tool according to the embodiment, it can be confirmed that the dirt is completely removed, as shown in FIG. 4C. In addition, as shown in FIG. 4C, according to the cleaning by the optical connector cleaning tool of the embodiment, no residual of the cleaning liquid is confirmed on the end face of the optical connector.

Furthermore, an optical connector cleaning tool including a mechanism configured to automatically start cleaning in a humidified state suitable for cleaning during a time from wetting of the cleaning cloth 101a immediately after mist supply to drying will be described with reference to FIG. 3B. In the optical connector cleaning tool, a start signal generation unit 135 formed by a switch, a pressure sensor, or the like and configured to generate a start signal serving as a sign of cleaning start, and an actuator 136 such as a motor configured to automatically rotate the winding reel 132 are added to the optical connector cleaning tool shown in FIG. 3A. These are connected to the control circuit 107, like the atomizer 103.

The operation of the mechanism will be described here using, as an example, a case in which the start signal generation unit 135 is formed by a pressure sensor. In this example, the start signal generation unit 135 is provided in the lower portion of the guide plate 133 against which a connector to be cleaned is pressed. When the connector is pressed against the guide plate 133 via the cleaning cloth 101a, the start signal generation unit 135 detects the pressing. The control circuit 107 including a pressure sensor measures a pressure value generated by the pressing, and upon determining that the measured pressure value has reached pressing suitable for cleaning, operates the atomizer 103 only for a time in which an appropriate humidified state is obtained. The control circuit 107 stops the atomizer 103 and immediately rotates the motor 136 such that the cleaning cloth 101a is wound by an amount necessary for cleaning. Alternatively, the control circuit 107 can rotate the motor 136 during the operation of the atomizer 103 to wind the cleaning cloth 101a. If the winding amount necessary for cleaning is set to a distance needed for the end face of the optical connector to pass through the humidified region of the cleaning cloth, only wet-type cleaning is performed. If the distance is increased such that the end face of the optical connector passes through a dry region of the cleaning cloth as well, wiping-up cleaning in which dry-type cleaning is performed after wet-type cleaning can be performed. As a result, since a series of operations from humidification of the cleaning cloth 101a to cleaning is automatically performed within a predetermined time, cleaning can always be performed in an appropriate humidified state.

Figure 2A:
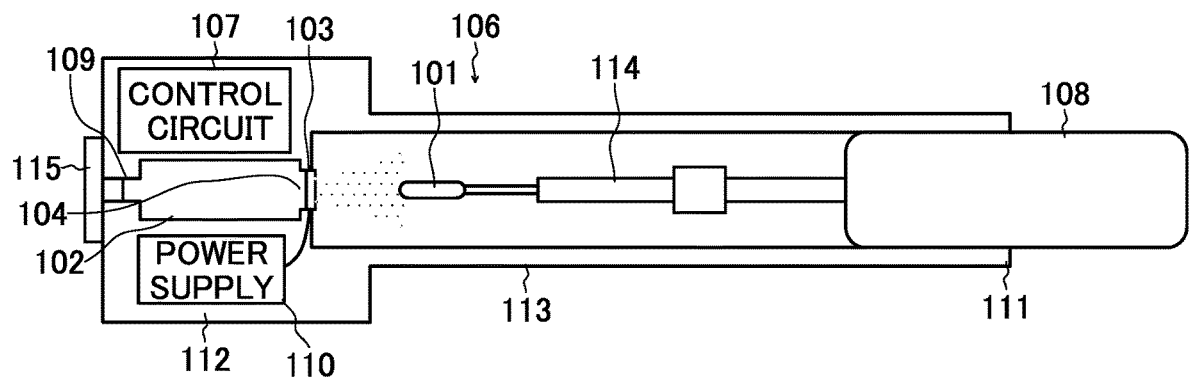
FIG. 2A is a view showing the arrangement of another optical connector cleaning tool according to the embodiment of the present invention.
Figure 2B:
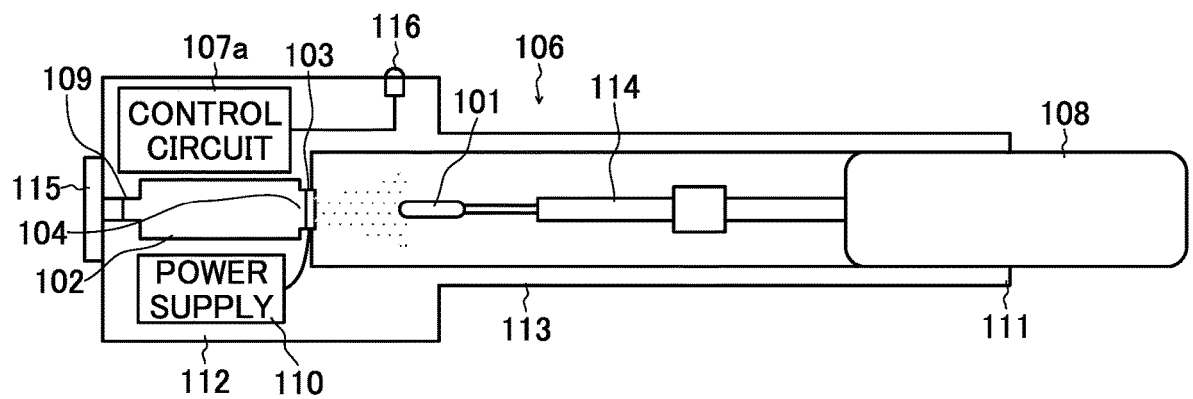
FIG. 2B is a view showing the arrangement of still another optical connector cleaning tool according to the embodiment of the present invention.
Figure 3A:
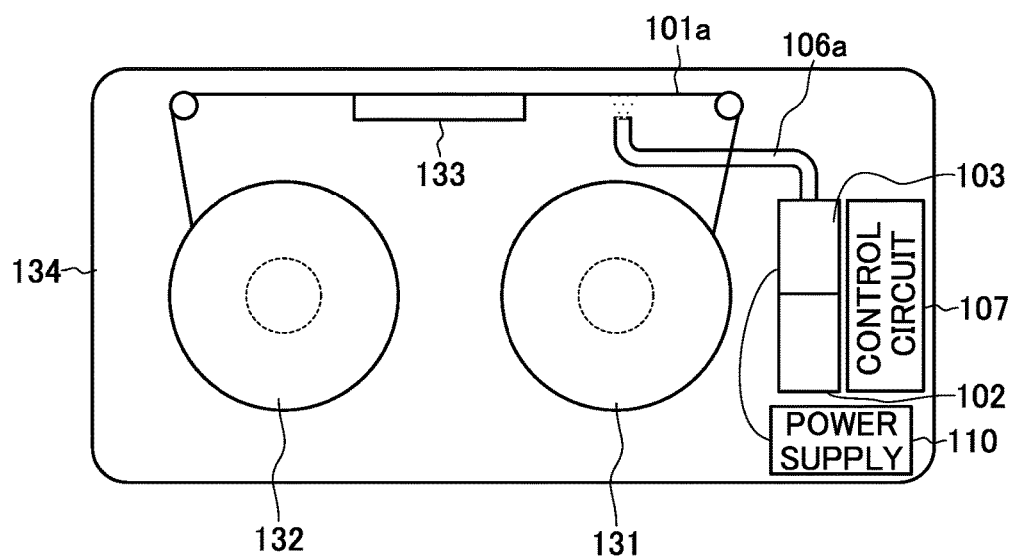
FIG. 3A is a view showing the arrangement of still another optical connector cleaning tool according to the embodiment of the present invention.
Figure 3B:
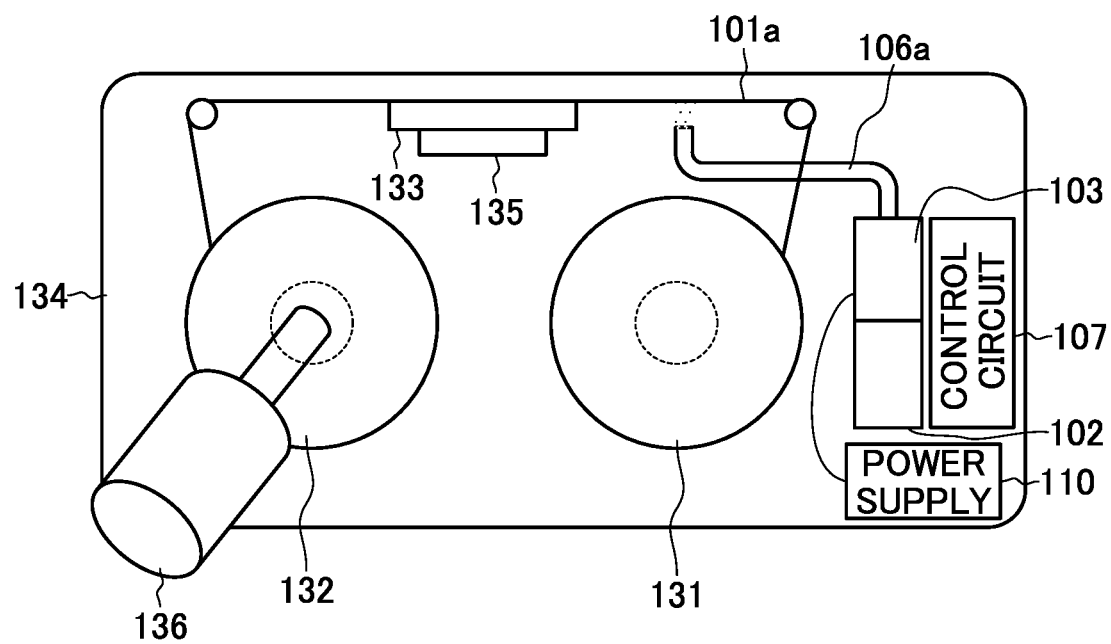
FIG. 3B is a view showing the arrangement of still another optical connector cleaning tool according to the embodiment of the present invention.

FIG. 2B shows an example in which an appropriate humidified state is indicated by the indicator in the optical connector cleaning tool shown in FIG. 2A, and FIG. 3B shows an example of a mechanism that automatically performs the operation from humidification to cleaning within a predetermined time in the optical connector cleaning tool shown in FIG. 3A. Both are means for performing cleaning in an appropriate humidified state. Since the means does not depend on the device, the operation from humidification to cleaning can automatically be performed within a predetermined time by adding a switch or a motor to the optical connector cleaning tool shown in FIG. 2A. Alternatively, an appropriate humidified state may be indicated by adding an indicator to the optical connector cleaning tool shown in FIG. 3A. Both means can be added to one optical connector cleaning tool, as a matter of course.

As described above, according to the present invention, since mist of the cleaning liquid atomized by the atomizer using ultrasonic atomization is supplied to the cleaning portion, an appropriate amount of cleaning liquid can be supplied to the cleaning portion. As a result, according to the present invention, high cleaning power can be exhibited even for dirt adhered to the coupling end face of an optical connector.

Additionally, according to the present invention, the cleaning body can evenly be wetted with the cleaning liquid. According to the present invention, the degree of wetting of the cleaning body by the cleaning liquid can easily be controlled, and the degree of wetting is reproduced at a high accuracy. According to the present invention, since the cleaning liquid is not heated, liquids including water soluble liquids and organic liquids can widely be selected as the cleaning liquid. In addition, since excessive supply of the cleaning liquid can be suppressed, cleaning can be performed a number of times using a small amount of cleaning liquid.

Note that the present invention is not limited to the embodiments described above, and many modifications and combinations can be made by those who have ordinary knowledge in this field within the technical scope of the present invention, as a matter of course.

EXPLANATION OF THE REFERENCE NUMERALS AND SIGNS

101 . . . cleaning portion, 102 . . . container, 103 . . . atomizer, 104 . . . liquid supply port, 105 . . . atomizing separation portion, 106 . . . supply portion, 107 . . . control circuit, 108 . . . grip portion, 110 . . . power supply, 121 . . . cleaning liquid

The invention claimed is:

1. An optical connector cleaning tool comprising:
   a cleaning portion configured to be pressed against a coupling end face of an optical connector;
   a container configured to store a cleaning liquid; and
   an atomizer configured to atomize the cleaning liquid stored in the container and spray the cleaning liquid directly to the cleaning portion.

2. The optical connector cleaning tool according to claim 1, wherein the atomizer is configured to atomize the cleaning liquid by ultrasonic atomization.

3. An optical connector cleaning tool comprising:
   a cleaning portion configured to be pressed against a coupling end face of an optical connector;
   a container configured to store a cleaning liquid;
   an atomizer configured to atomize the cleaning liquid stored in the container and spray the cleaning liquid directly or indirectly to the cleaning portion; and
   a control circuit configured to control an operation time of the atomizer.

4. An optical connector cleaning tool comprising:
   a cleaning portion configured to be pressed against a coupling end face of an optical connector;
   a container configured to store a cleaning liquid;
   an atomizer configured to atomize the cleaning liquid stored in the container and spray the cleaning liquid directly or indirectly to the cleaning portion;
   a start signal generation unit configured to output a signal of a start of cleaning; and
   an actuator configured to apply a cleaning operation to the cleaning portion,
   wherein the atomizer starts atomization of the cleaning liquid when the start signal generation unit outputs the signal, and
   the actuator applies the cleaning operation to the cleaning portion when the cleaning portion is humidified by the mist of the cleaning liquid.

* * * * *